(12) United States Patent
Snyder, II

(10) Patent No.: US 9,022,827 B2
(45) Date of Patent: May 5, 2015

(54) WIRELINE FLOTATION DEVICE AND METHOD

(71) Applicant: Gary Allen Snyder, II, Covington, LA (US)

(72) Inventor: Gary Allen Snyder, II, Covington, LA (US)

(73) Assignee: Expert E & P Consultants, L.L.C., Madisonville, LA (US)

( * ) Notice: Subject to any disclaimer, the term of this patent is extended or adjusted under 35 U.S.C. 154(b) by 115 days.

(21) Appl. No.: 13/763,793

(22) Filed: Feb. 11, 2013

(65) Prior Publication Data

US 2014/0227923 A1 Aug. 14, 2014

(51) Int. Cl.
*B63B 22/00* (2006.01)
*B63B 51/02* (2006.01)
*F16L 1/24* (2006.01)

(52) U.S. Cl.
CPC ........................................ *F16L 1/24* (2013.01)

(58) Field of Classification Search
CPC ............... F16L 1/24; B63B 2021/222; B63B 2021/225; B63B 2022/02; B63B 2022/028
USPC .......................................... 441/133, 134, 136
See application file for complete search history.

(56) References Cited

U.S. PATENT DOCUMENTS

| | | | | |
|---|---|---|---|---|
| 2,540,831 A | * | 2/1951 | Pfleumer ....................... | 441/133 |
| 3,729,756 A | * | 5/1973 | Cook et al. ................... | 441/133 |
| 3,858,401 A | * | 1/1975 | Watkins ..................... | 405/224.2 |
| 4,477,207 A | * | 10/1984 | Johnson ..................... | 405/195.1 |
| 4,596,531 A | * | 6/1986 | Schawann et al. ............ | 441/133 |
| 5,330,294 A | * | 7/1994 | Guesnon ..................... | 405/224.2 |
| 6,155,748 A | * | 12/2000 | Allen et al. ................. | 405/195.1 |
| 6,270,387 B1 | * | 8/2001 | Nesheim ...................... | 441/133 |
| 7,383,885 B2 | | 6/2008 | Bergeron | |
| 7,771,245 B2 | * | 8/2010 | Routeau et al. .............. | 441/133 |
| 8,443,896 B2 | * | 5/2013 | Howard et al. ............... | 166/345 |
| 2008/0289829 A1 | | 11/2008 | Bergeron et al. | |

* cited by examiner

*Primary Examiner* — Daniel V Venne
(74) *Attorney, Agent, or Firm* — Jones Walker LLP

(57) ABSTRACT

A wireline floatation device capable of reducing the weight of a wireline deployed down a well bore may include a floatation module capable of being detachably affixed to a wireline and formed at least partially of a buoyant material. A groove in the floatation module may extend longitudinally from a top face to a bottom face and laterally from an inner portion to an outer surface to receive the wireline. The groove may include a wireline receptacle portion capable of operatively housing the wireline. The floatation module may also include one or more gripping means capable of retaining the floatation module at a predetermined position on the wireline. The floatation module may further include a retaining means capable of selectively retaining the wireline within the groove. The floatation module may include a plurality of floatation modules capable of being operatively engaged to each other and detachably affixed to the wireline.

18 Claims, 15 Drawing Sheets

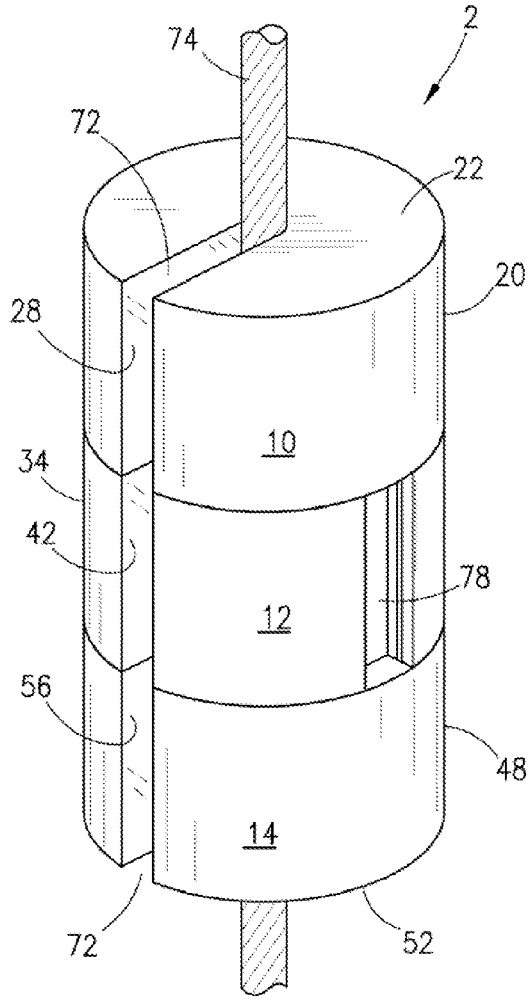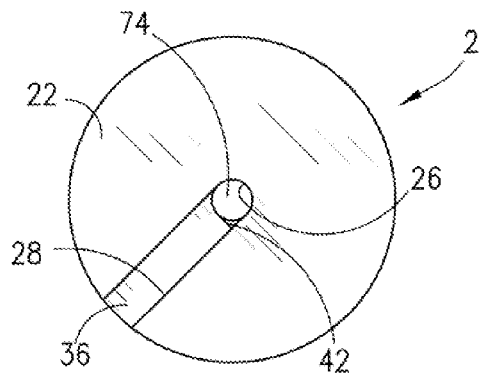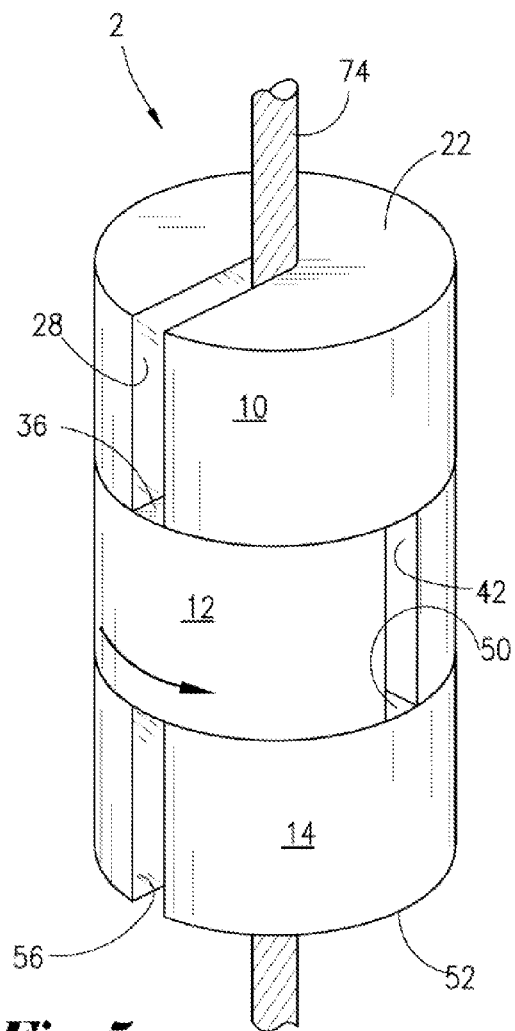

WIRELINE FLOTATION DEVICE AND METHOD

FIELD OF THE INVENTION

This invention relates to a floatation device and method for wireline, and more particularly to a floatation device and method for wireline that permits wireline operations to be conducted at extended depths in a well bore.

BACKGROUND OF THE INVENTION

Hydrocarbon reservoirs are being discovered and developed offshore in deep water tracts. Offshore drilling platforms may be anchored in water depths of more than 9,200 feet or dynamically positioned in water depths greater than 10,000 feet. Offshore wells are being drilled to depths that exceed 34,000 feet.

Wireline operations are often conducted on offshore platforms. Wireline units, also known as logging units, may be used to survey hydrocarbon wells to determine their geological, petrophysical, or geophysical properties. An electronic measuring instrument or logging tool is lowered into the well bore on a steel cable known as a wireline. The logging tool takes measurements and transmits them to the well surface through electronic circuits in the wireline. Other downhole tools, besides logging tools, may be used on wireline. Adapted with such other tools, wireline may be used to perforate pipe or casing, recover pipe or tools, run casing, run lines, run landing string, and work over a well.

In deep water the wireline must be run to a greater depth. As the wireline tool and wireline are lowered into the well, the line weight increases as the depth of the tool is increased. Eventually, the tensile strength of the wireline is reached. When this happens, the wireline either breaks or the tool and wireline cannot be pulled out of the well. This failure would cause catastrophic equipment loss, unnecessary recovery costs, and delay operations.

Because reservoirs are being discovered at deeper water depths and wells are being drilled to deeper depths, the need exists for wireline operations that function reliably, effectively, and without failure at ever increasing depths.

SUMMARY OF THE INVENTION

It is an object of the present invention to provide a floatation device and method capable of running wireline tools to increased depths.

It is a further object of the present invention to provide a floatation device and method that reduces the line weight of wireline run downhole.

It is a further object of the present invention to provide a floatation device capable of being detachably affixed to a wireline.

These and other objects and advantages are achieved by the novel wireline floatation device described herein, which may include a floatation module capable of being detachably affixed to a wireline. The floatation module may be at least partially formed of a buoyant material. The floatation module may have a top face, a bottom face, an interconnected side face, an inner portion, and an outer surface.

The floatation module may also include a groove for receiving the wireline. The groove may extend longitudinally through the floatation module from the top face to the bottom face, and may extend laterally through the floatation module from the inner portion to the outer surface. The inner portion of the floatation module may be a center portion of the floatation module. The groove may include a wireline receptacle portion capable of operatively housing the wireline.

The floatation module may also include one or more gripping means capable of retaining the floatation module on the wireline at a predetermined position when the wireline is housed in the wireline receptacle portion of the floatation module. The one or more gripping means may be positioned about the wireline receptacle portion of the floatation module, and may be a slip. The floatation module may also include a retaining means capable of selectively retaining the wireline within the groove. The floatation module may be cylindrically shaped.

The floatation module may include a plurality of floatation modules capable of being operatively engaged to each other and detachably affixed to the wireline. The plurality of floatation modules may include one or more buoyant modules and one or more retaining modules. The retaining modules may be capable of being operatively connected to the buoyant modules. The retaining modules may also be capable of detachably affixing the buoyant modules to the wireline.

In another embodiment, the wireline floatation module may include a first floatation module, a second floatation module, and a third floatation module. The first, second, and third floatation modules may be capable of being operatively connected to one another and detachably affixed to a wireline. The first, second, and third floatation modules may be capable of buoyantly reducing the overall weight of the wireline. The first floatation module may have a first top face, a first bottom face, a first interconnected side face, a first inner portion, a first outer surface, and a first groove. The first groove may extend longitudinally through the first floatation module from the first top face to the first bottom face and laterally through the first floatation module from the first inner portion to the first outer surface. The second floatation module may have a second top face, a second bottom face, a second interconnected side face, a second inner portion, a second outer surface, and a second groove. The second groove may extend longitudinally through the second floatation module from the second top face to the second bottom face and laterally through the second floatation module from the second inner portion to the second outer surface. The third floatation module may have a third top face, a third bottom face, a third interconnected side face, a third inner portion, a third outer surface, and a third groove. The third groove may extend longitudinally through the third floatation module from the third top face to the third bottom face and laterally through the third floatation module from the third inner portion to the third outer surface.

The wireline floatation device may further include at least one pin member capable of interconnecting the first, second, and third floatation modules. The first floatation module may further include at least one pin member bore in the first bottom face adapted to receive a first end of each of said pin members. The third floatation module may further include at least one pin member bore in the third top face adapted to receive a second end of each of said pin members. The second floatation module may further include at least one pin member recess extending from the second top face to the second bottom face and adapted to slidingly receive each of said pin members. For example, the wireline floatation module may include two pin members, the first floatation module may include two pin member bores in the first bottom face, the second floatation module may include two pin member recesses, and the third floatation module may include two pin member bores in the third top face.

When the first, second, and third floatation modules are in operative engagement and the first, second, and third grooves are aligned, the first, second, and third grooves form a wireline window capable of receiving the wireline. The first, second, and third grooves may each include a wireline receptacle portion capable of operatively housing the wireline. The second floatation module may be capable of being reciprocated with respect to the first and third floatation modules while the wireline is housed in the wireline receptacle portions to prevent the wireline from exiting the wireline receptacle portions.

One or more of the first, second, or third floatation modules may include a plurality of gripping means capable of retaining the device on the wireline at a predetermined position when the wireline is housed in the wireline receptacle portions of the first, second, and third floatation modules. For example, each of the first, second, and third floatation modules may include the plurality of gripping means. The plurality of gripping means may be slips positioned about the wireline receptacle portions.

The wireline floatation device may also include an anti-rotation means for selectively disabling the second floatation module from re-reciprocating to form the wireline window. The anti-rotation means may include a key assembly disposed within a key recess in the second floatation module. The key assembly may include one or more spring-loaded keys. The first and third floatation modules may each include a key recess adapted to receive each of the spring-loaded keys when the second floatation module is reciprocated, thereby disabling the second floatation module from re-reciprocating to form the wireline window.

The key assembly may include a first key, a second key, and a body including a first spring operatively connected to the first key and a second spring operatively connected to the second key. The first floatation module may include a first key recess adapted to receive the first key due to the force exerted by an expansion of the first spring when the second floatation module is reciprocated. The third floatation module may include a second key recess adapted to receive the second key due to the force exerted by an expansion of the second spring when the second floatation module is reciprocated. The first and second keys may each include a release groove capable of being engaged in order to compress the first and second spring and release the first and second keys from the first and second key recesses, thereby allowing re-reciprocation of the second floatation module to form the wireline window. The body of the key assembly may include a longitudinal lip for slidingly engaging a groove of the key recess of the second floatation module for retaining the key assembly within the key recess.

Alternatively, the anti-rotation means may include a pin assembly disposed within a cavity in the second floatation module. The pin assembly may be capable of selectively engaging one of the pin members when the second floatation module is reciprocated, thereby disabling the second floatation module from re-reciprocating to form the wireline window. If the wireline floatation device includes two pin members and the second floatation module includes two pin member recesses and two cavities extending from the second outer surface to each of the pin member recesses, the anti-rotation means may include two pin assemblies, each including a stopper adapted to selectively engage a notch in each of the pin members.

Each of the pin assemblies may further include a body, a support member, and one or more bearings. The body may be affixed to an inner wall of the cavity. The body may include an inner wall having one or more outer bearing cavities and one or more inner bearing cavities. The support member may be slidingly disposed within the body. An internal end of the support member may be affixed to the stopper such that translational movement of the support member within the body translationally moves the stopper within the body. The bearings may be adapted to selectively engage the outer bearing cavities and the inner bearing cavities such that translational movement of the support member and the stopper is disabled. In a neutral position, the bearings may engage the outer bearing cavities such that the stopper is locked within the body. In an engaged position, the bearings may engage the inner bearing cavities such that the stopper is locked into engagement with the notch in each pin member.

The present invention is also directed to a method of reducing the weight of a wireline deployed down a well bore. The method may include providing a wireline floatation device. The wireline floatation device may include a floatation module formed at least partially of a buoyant material and capable of being detachably affixed to a wireline. The floatation module may have a top face, a bottom face, an interconnected side face, a central inner portion, and an outer surface. The method may further include attaching the floatation module to the wireline. The method may further include running the wireline down the well bore to a position where the floatation module becomes buoyant and reduces the weight of the wireline.

The floatation module may also include a groove for receiving the wireline. The groove may extend longitudinally through the floatation module from the top face to the bottom face and laterally through the floatation module from the central inner portion to the outer surface. Attaching the floatation module to the wireline may include inserting the wireline into the groove and causing the floatation module to selectively retain the wireline. The floatation module may include an assembly of at least three floatation modules operatively engaged to each other and detachably affixed to the wireline.

The method may further include providing a second wireline floatation device including a second floatation module formed at least partially of a buoyant material. The second floatation module may be capable of being detachably affixed to a wireline. The second floatation module may have a top face, a bottom face, an interconnected side face, a central inner portion, and an outer surface. The method may further include attaching the second floatation module to the wireline. The method may further include running the wireline down the well bore to a position where the second floatation module becomes buoyant and further reduces the weight of the wireline.

The method may further include pulling the wireline out of the well bore, detaching the second floatation device from the wireline, and detaching the first floatation device from the wireline.

BRIEF DESCRIPTION OF THE DRAWINGS

FIG. 3 is an isometric front view of the floatation device of the present invention in the closed position.

FIG. 4 is a top view of the floatation device of the present invention.

FIG. 5 is an isometric front view of the floatation device of the present invention in an engaged position.

DETAILED DESCRIPTION OF THE PREFERRED EMBODIMENTS

Figure 1:
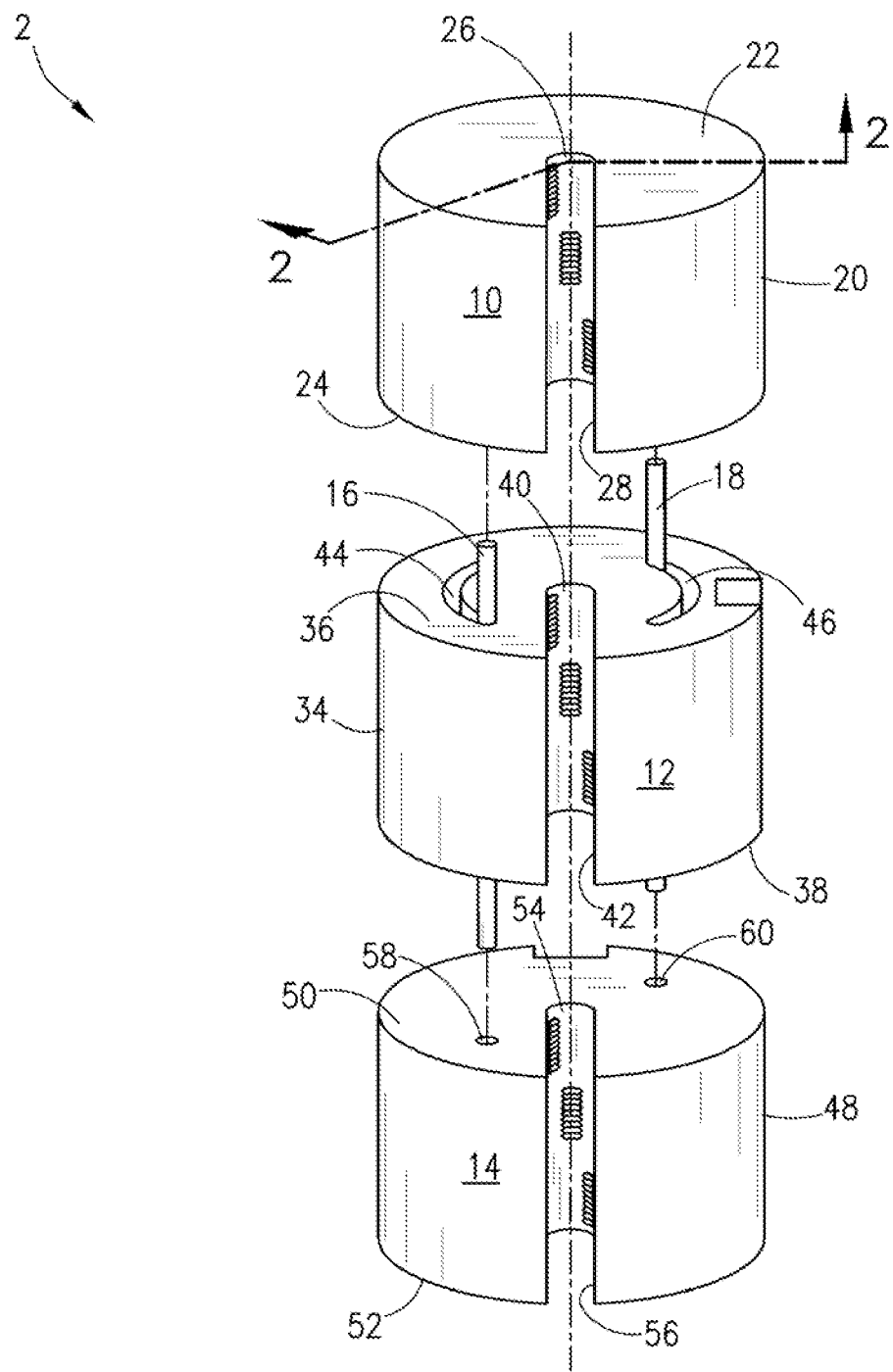
FIG. 1 is an isometric front view of the floatation device of the present invention in a separated position.

With reference to the figures where like elements have been given like numerical designation to facilitate an understanding of the present invention, and in particular with reference to the embodiment of the present invention illustrated in FIG. 1, wireline floatation device 2 is shown in a separated position and not engaged on a wireline. Device 2 may include first floatation module 10, second floatation module 12, third floatation module 14, and pin members 16 and 18. First floatation module 10, second floatation module 12, and third floatation module 14 may be cylindrically shaped. The total length of floatation modules 10, 12, 14 may but need not be in the range of five inches to one foot. Floatation modules 10, 12, 14 may each be completely or partially formed of a buoyant material. For example, the buoyant material may be a syntactic foam commercially available from CRP Corporation under the name Syntactic Foam. Other examples of buoyant material that may be used include rubber, wood, foam, polymers, air, carbon silicate, foam cement, or any material that can be placed inside of or molded to form a wireline floatation module. It is to be understood that floatation modules 10, 12, 14 may each be formed in a variety of shapes and dimensions depending on the operation parameters involved in the wireline operation. Preferably, floatation modules 10, 12, 14 are each shaped and sized as to be capable of being deployed downhole, run past equipment in the well bore, and provide sufficient buoyancy. It is to be further understood that while device 2 is shown as including three floatation modules 10, 12, 14, device 2 could, for example, include one, two, or a plurality of floatation modules.

As seen in FIG. 1, first floatation module 10 may include first outer surface 20, first top face 22, first bottom face 24, and first inner portion 26. First groove 28 extends longitudinally from first top face 22 to first bottom face 24, and extends laterally from first inner portion 26 to first outer surface 20 of first floatation module 10. First floatation module 10 may include first pin bores 30, 32 (shown in FIG. 2) in first bottom face 24.

Again with reference to FIG. 1, second floatation module 12 may include second outer surface 34, second top face 36, second bottom face 38, and second inner portion 40. Second groove 42 extends longitudinally from second top face 36 to second bottom face 38, and extends laterally from second inner portion 40 to second outer surface 34 of second floatation module 12. Second floatation module 12 may also include pin member recesses 44, 46 for receiving pin members 16, 18. Pin member recesses 44, 46 may extend from second top face 36 to second bottom face 38 such that pin members 16, 18 may extend therethrough.

Referring still to FIG. 1, third floatation module 14 may include third outer surface 48, third top face 50, third bottom face 52, and third inner portion 54. Third groove 56 extends longitudinally from third top face 50 to third bottom face 52, and extends laterally from third inner portion 54 to third outer surface 48 of third floatation module 14. Third floatation module 14 may also include third pin bores 58, 60 in third top face 50.

Figure 2:
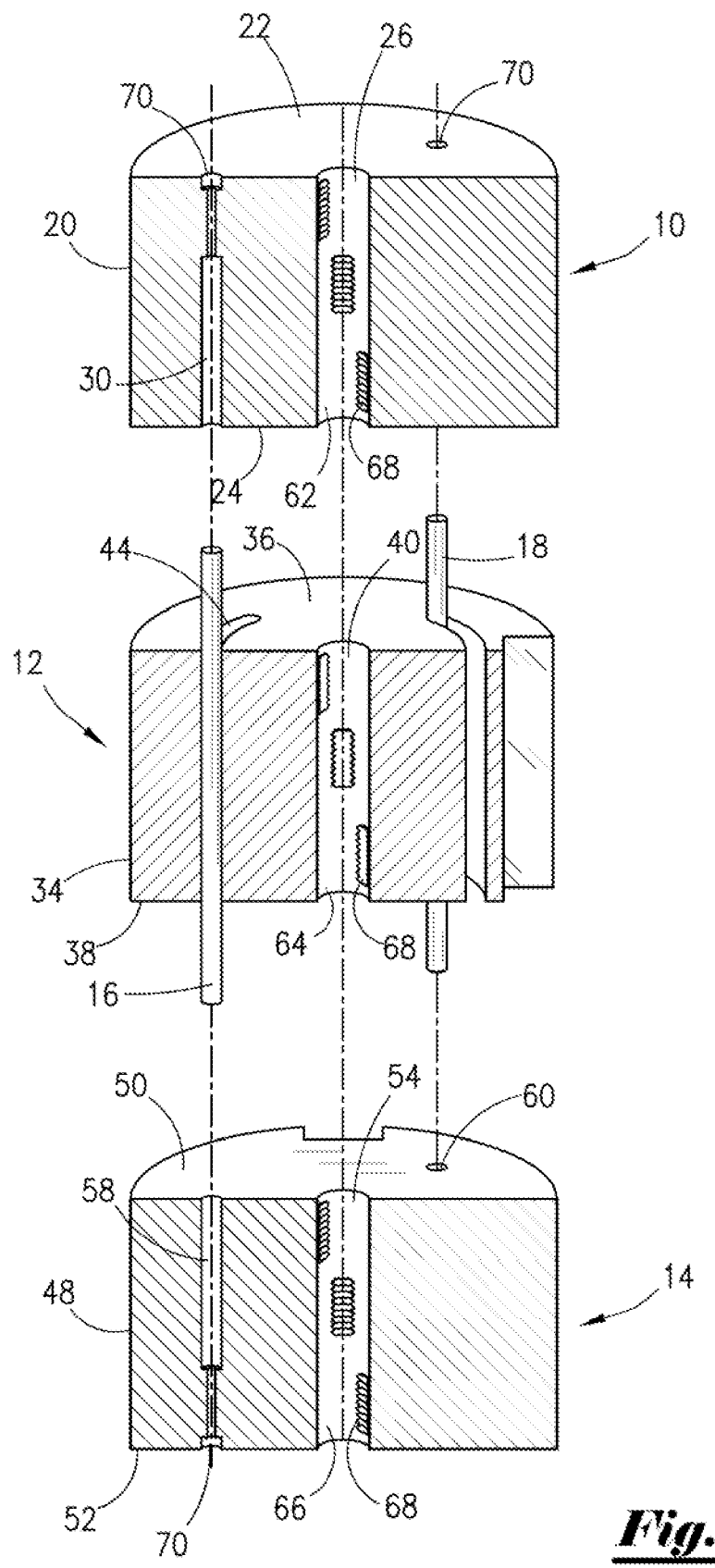
FIG. 2 is a cross-sectional view of the floatation device of FIG. 1 taken along line 2-2.

FIG. 2 is a cross-sectional view of the floatation module 10 taken along line 2-2. First inner portion 26 of floatation module 10 may have first inner surface 62. Second inner portion 40 of floatation module 12 may have second inner surface 64. Third inner portion 54 of floatation module 14 may have third inner surface 66. Plurality of friction slips 68 may be affixed to first inner surface 62, second inner surface 64, and third inner surface 66. Friction slips 68 may be made of any material that sufficiently grips the wireline to hold the floatation modules in place. For example, friction slips 68 may be made of rubber, aluminum, lead, polyurethane, carbon steel, stainless steel, polymers, plastics, or syntactic foam. The number of friction slips 68 per floatation module may vary depending on the parameters of the wireline operations being conducted and the adequacy of the gripping function. For example, each floatation module 10, 12, 14 may contain between two and ten friction slips 68. Friction slips 68 may be affixed to inner surfaces 62, 64, 66 by a variety of means such as by cementing, gluing, welding, or mechanical attachment. Friction slips 68 may also be integrally formed with inner surfaces 62, 64, 66.

FIG. 3 shows device 2 in a closed position. Floatation modules 10, 12, 14 are positioned such that pin members 16, 18 are secured within first pin bores 30, 32 and third pin bores 58, 60. Ends of pin members 16, 18 may be secured within pin bores 30, 32, 58, 60 by any fastening mechanism, such as with glue, bolts, or screws. For example, pin members 16, 18 may be secured within pin bores 30, 32, 58, 60 with bolts or screws positioned in bolt bores 70 as illustrated in FIG. 2. Alternatively, pin bores 30, 32, 58, 60 may be capable of threadedly engaging pin members 16 and 18.

Alignment of first, second, and third grooves 28, 42, 56 forms wireline window 72 extending from first top face 22 of first floatation module 10 to third bottom face 52 of third floatation module 14. Device 2 may be attached to wireline 74 by sliding wireline 74 through wireline window 72 from first, second, and third outer surfaces 20, 34, 48 into inner portions 26, 40, 54 of first, second, and third floatation modules 10, 12, 14.

FIGS. 4 and 5 illustrate device 2 in an engaged position. Second floatation module 12 is rotated relative to first and third floatation modules 10, 14 such that wireline window 72 is no longer visible. In other words, second groove 42 is no longer in line with first and third grooves 28, 56. Second floatation module 12 may be rotated 90 degrees relative to first and third floatation modules 10, 14. Alternatively, second floatation module 12 may be rotated 45 degrees relative to first and third floatation modules 10, 14. Any other degree of rotation of module 12 may be used that displaces second groove 42 from first and third grooves 28, 56. Rotation of second floatation module 12 causes each of the plurality of friction slips 68 (FIG. 2) to grip wireline 74 in order to prevent device 2 from moving longitudinally up or down wireline 74. It is to be understood that the material forming device 2 alone could be sufficient due to the camming action caused by the rotation of floatation modules 10, 12, or 14, to hold device 2 stationary on wireline 74 in which case friction slips 68 need not be used.

Figure 6:
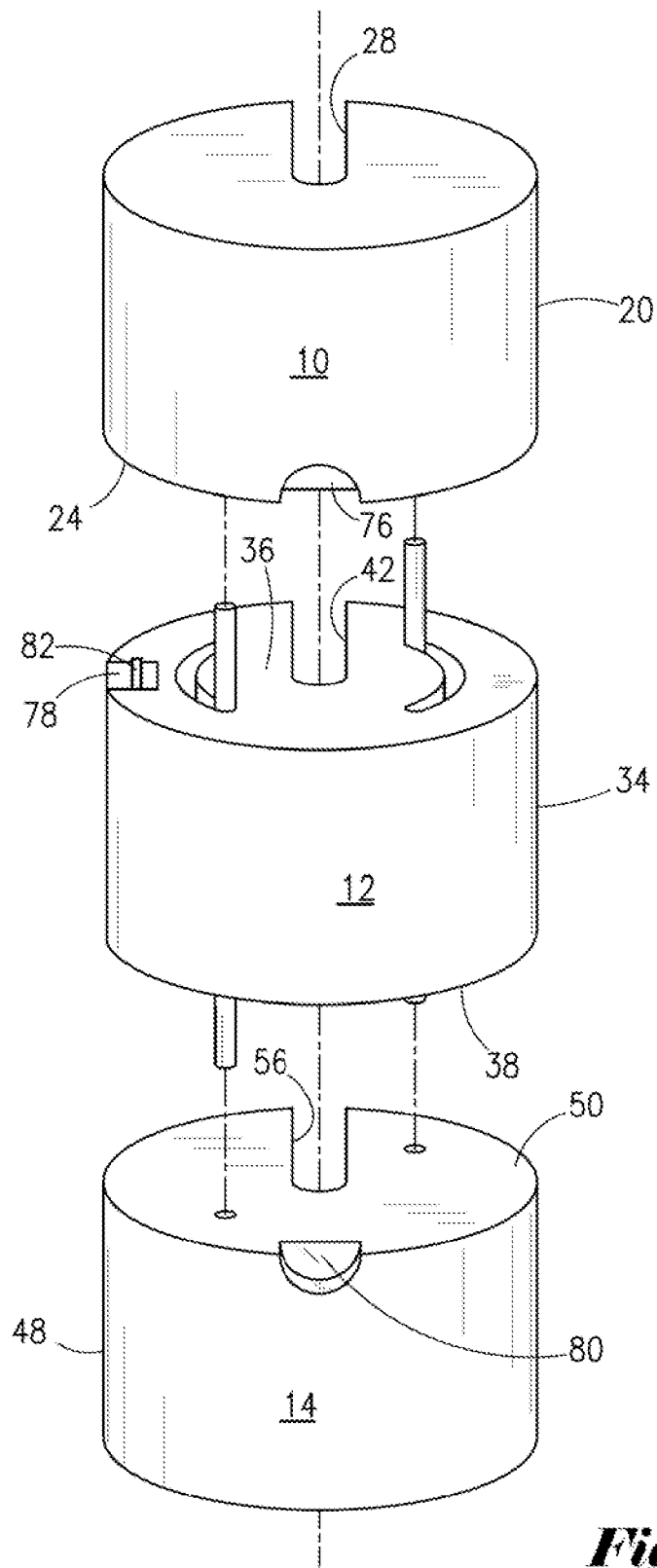
FIG. 6 is an isometric back view of the floatation device in the separated position.

With reference to FIG. 6, floatation modules 10, 12, and 14 may also include first key recess 76, second key recess 78, and third key recess 80, respectively. First key recess 76 may extend a specified depth inward from first outer surface 20, and may extend a specified distance from first bottom face 24. Third key recess 80 may extend a specified depth inward from third outer surface 48, and may extend a specified distance from third top face 50. The specified depth and specified distance of first key recess 76 may, but need not, be equal to the specified depth and specified distance of third key recess 80. Second key recess 78 may extend from second top face 36 to second bottom face 38. Second key recess may include groove 82, which may also extend from second top face 36 to second bottom face 38. Second key recess 78 may extend a specified depth inward from second outer surface 34. The specified depth of second key recess 78 may be equal to the specified depth of first and third key recesses 76 and 80. Alternatively, the specified depth of second key recess 78 may be different from the specified depths of first and third key recess 76 and 80. For example, the specified depth of second key recess 78 may be greater than the specified depths of first and third key recesses 76 and 80.

Figure 7:
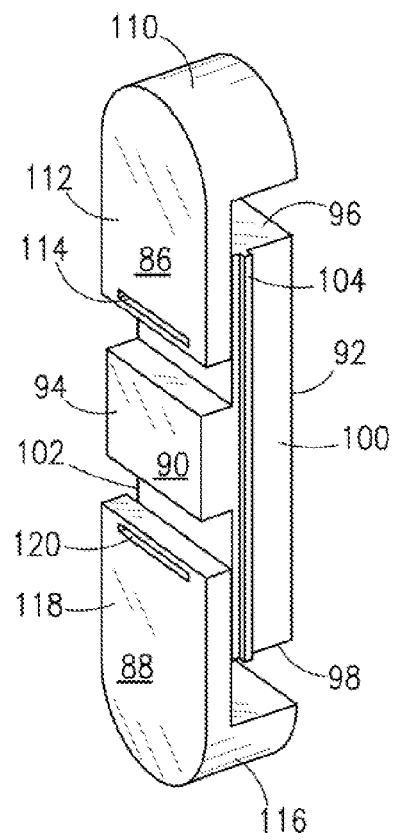
FIG. 7 is an isometric view of the anti-rotation key assembly.
Figure 8:
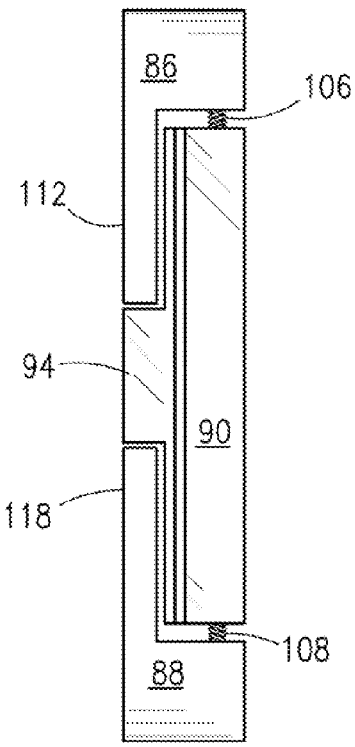
FIG. 8 is a side view of the anti-rotation key assembly in a compressed position.
Figure 9:
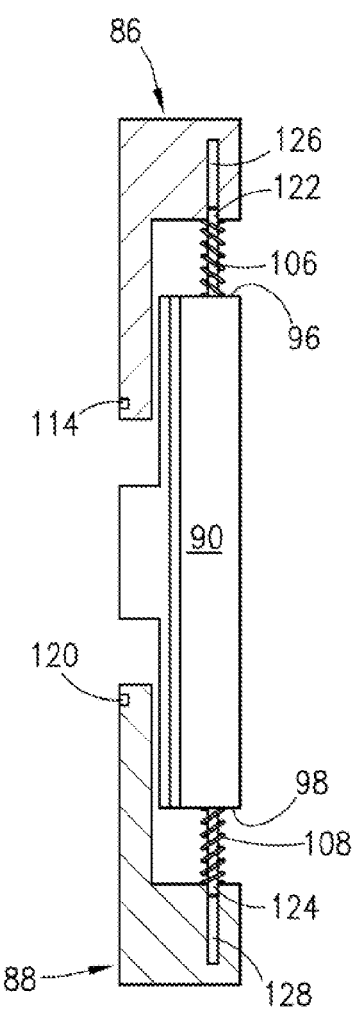
FIG. 9 is a side view of the anti-rotation key assembly in an engaged position.

Referring now to FIG. 7 through 9, anti-rotation key assembly 84 may include first key 86, second key 88, and base 90. Base 90 may be positioned between first and second keys 86 and 88. Base 90 may include rear portion 92 and protruding portion 94. Rear portion 92 may include top surface 96, bottom surface 98, side surfaces 100, 102, and lip 104 extending along the length of side surfaces 100, 102. Anti-rotation key assembly 84 may be adapted to fit within first, second, and third key recesses 76, 78, 80 in floatation modules 10, 12, 14. Lip 104 on both sides of base 90 may engage groove 82 such that anti-rotation key assembly 84 is aligned within key recesses 76, 78, 80. Base 90 may also include springs 106 and 108. Springs 106, 108 may be attached to top and bottom surfaces 96, 98, respectively. Alternatively, springs 106, 108 may each be attached to an engaging member which may be secured within recesses in top and bottom surfaces 96, 98, respectively.

Referring still to FIGS. 7 through 9, first key 86 may include key portion 110 and protruding portion 112 having release groove 114. Second key 88 may include key portion 116 and protruding portion 118 having release groove 120. Spring 106 may directly or indirectly engage key portion 110 of first key 86, and spring 108 may directly or indirectly engage key portion 110 of second key 88. In this way, anti-rotation key assembly 84 may be spring-loaded. Springs 106 and 108 may be directly attached to the surfaces of key portions 110, 116. Alternatively, engaging member 122 may be affixed to spring 106 and engaging member 124 may be affixed to spring 108. Engaging member 122 may be securable within recess 126 in key portion 110 of first key 86, and engaging member 124 may be securable within recess 128 in key portion 116 of second key 88 as shown in FIG. 9.

First and second keys 86 and 88 may be compressed by forces acting upon key portions 110 and 116. First and second keys 86 and 88 may also be compressed with a tool capable of engaging and exerting a compressive force on release grooves 114 and 120 of first and second keys 86 and 88. When first and second keys 86 and 88 are compressed (by compressing springs 106 and 108), protruding portions 112 and 118 of first and second keys 86 and 88 may engage protruding portion 94 of base 90, as shown in FIG. 8. Alternatively, base 90 may not include protruding portion 94 such that when first and second keys 86 and 88 are compressed, their protruding portions 112 and 118 engage one another.

Figure 10:
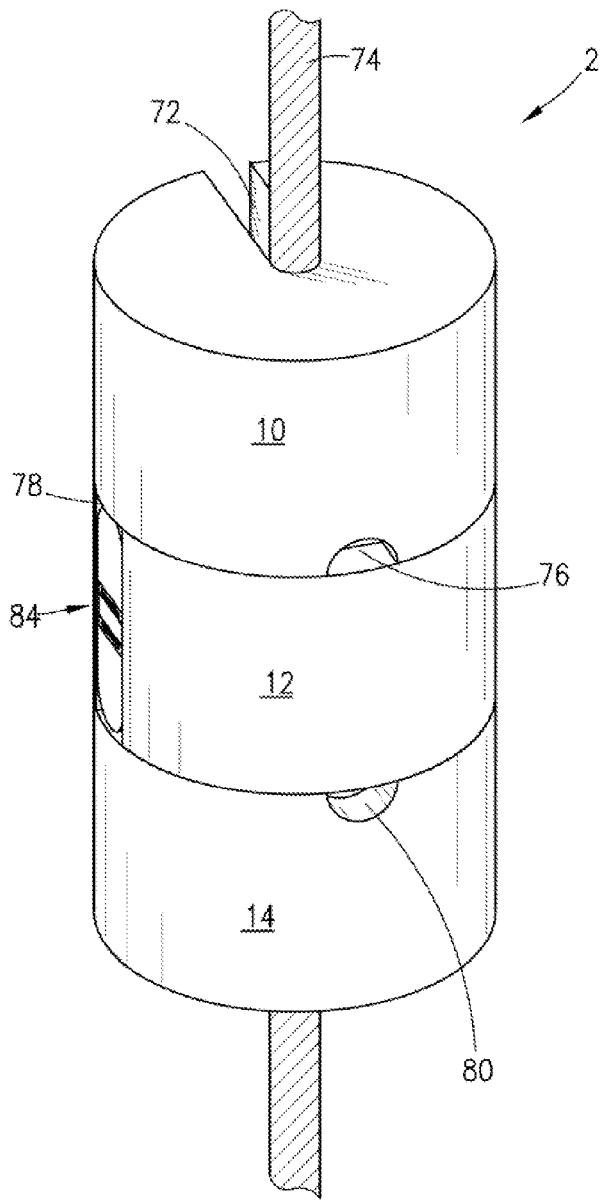
FIG. 10 is an isometric back view of the floatation device in the closed position with the anti-rotation key assembly installed and in the compressed position.
Figure 11:
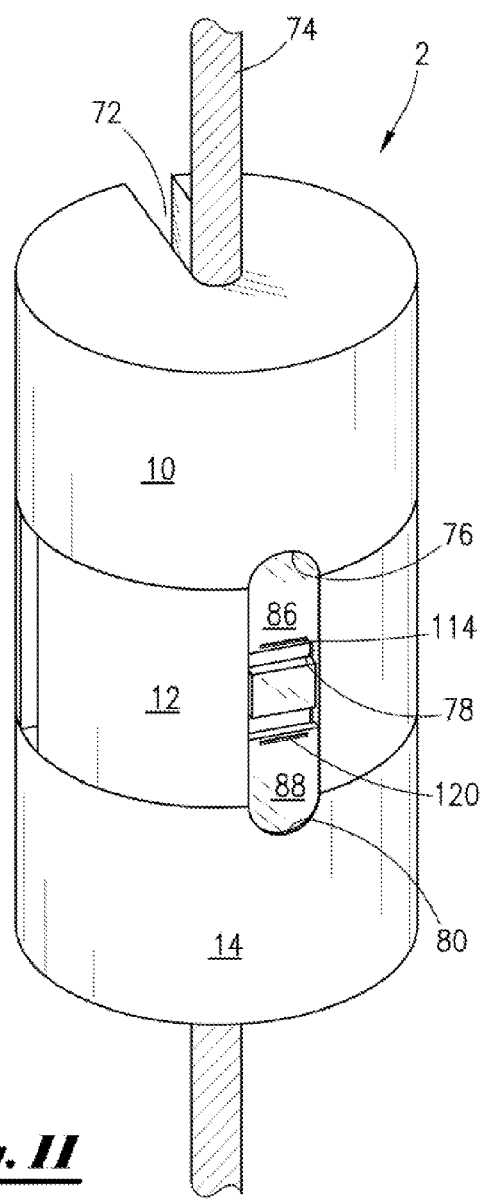
FIG. 11 is an isometric back view of the floatation device in the engaged position with the anti-rotation key assembly.

FIG. 10 illustrates anti-rotation key assembly 84 in the compressed position within second key recess 78 of second floatation module 12. Device 2 is in the closed position such that grooves 28, 42, 56 form wireline window 72 for insertion of wireline 74. As shown in FIG. 11, key recesses 76, 78, and 80 are aligned when device 2 is in the engaged position (i.e., after rotating second floatation module 12 relative to first and third floatation modules 10 and 14). In the engaged position, keys 86, 88 of anti-rotation key assembly 84 may expand into first and third key recesses 76, 80, respectively. While engaged with first and third key recesses 76, 80, keys 86, 88 prevent rotation of second floatation module 12. A tool may be used to engage release grooves 114, 120 and compress keys 86, 88 such that anti-rotation key assembly 84 fits within second key recess 78 allowing rotation of second floatation module 12.

Figure 12:
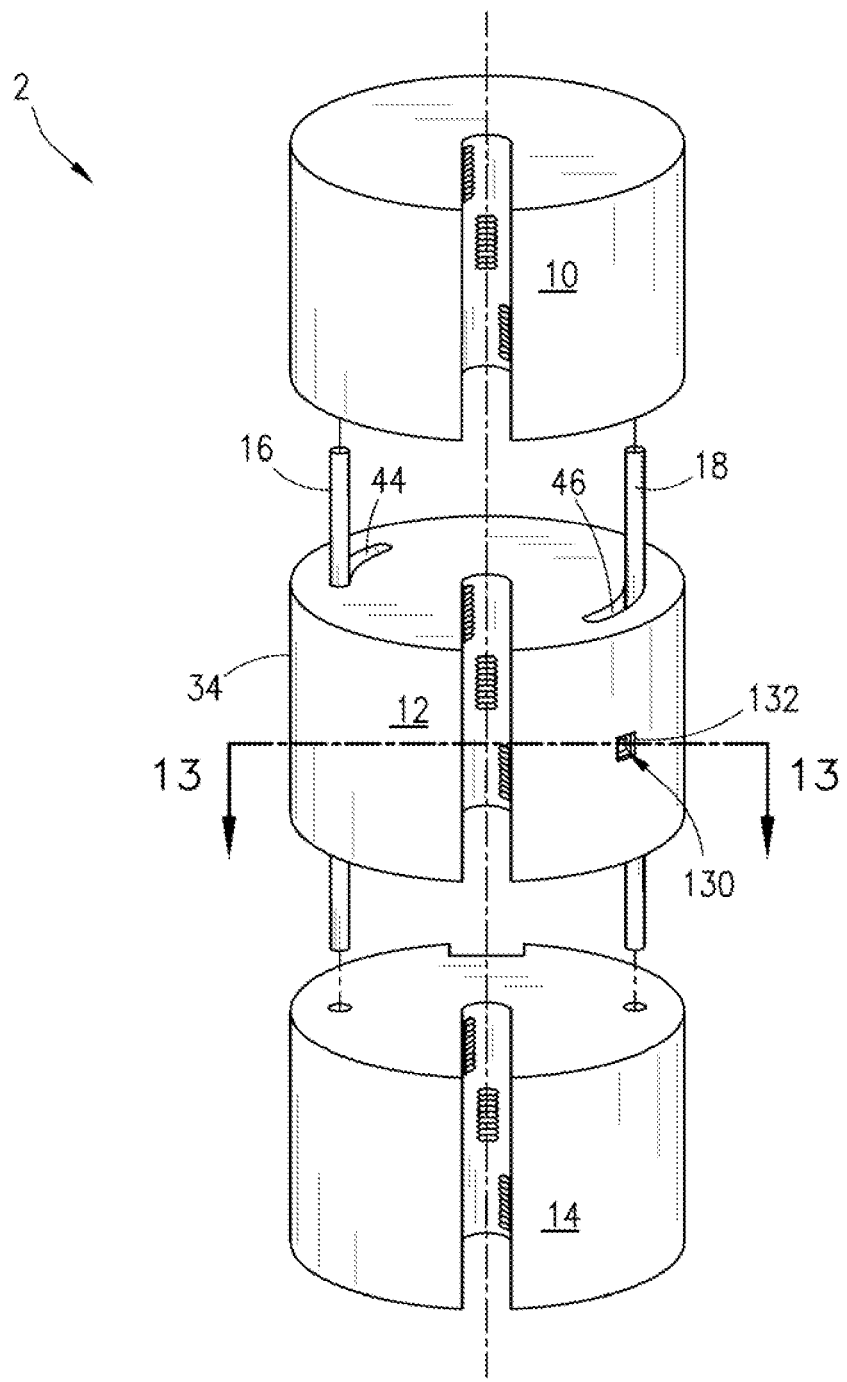
FIG. 12 is an isometric front view of an alternate embodiment of the floatation device.

FIG. 12 shows an alternate embodiment of device 2. In this embodiment, device 2 does not include anti-rotation key assembly 84. Instead, device 2 includes anti-rotation pin assembly 130 disposed within cavity 132 in second floatation module 12. Device 2 may also include anti-rotation pin assembly 134 disposed within cavity 136 in second floatation module 12 (see FIGS. 13 and 14). Cavity 132 may extend from second outer surface 34 to pin member recess 46, and cavity 136 may extend from second outer surface 34 to pin member recess 44.

Figure 13A:
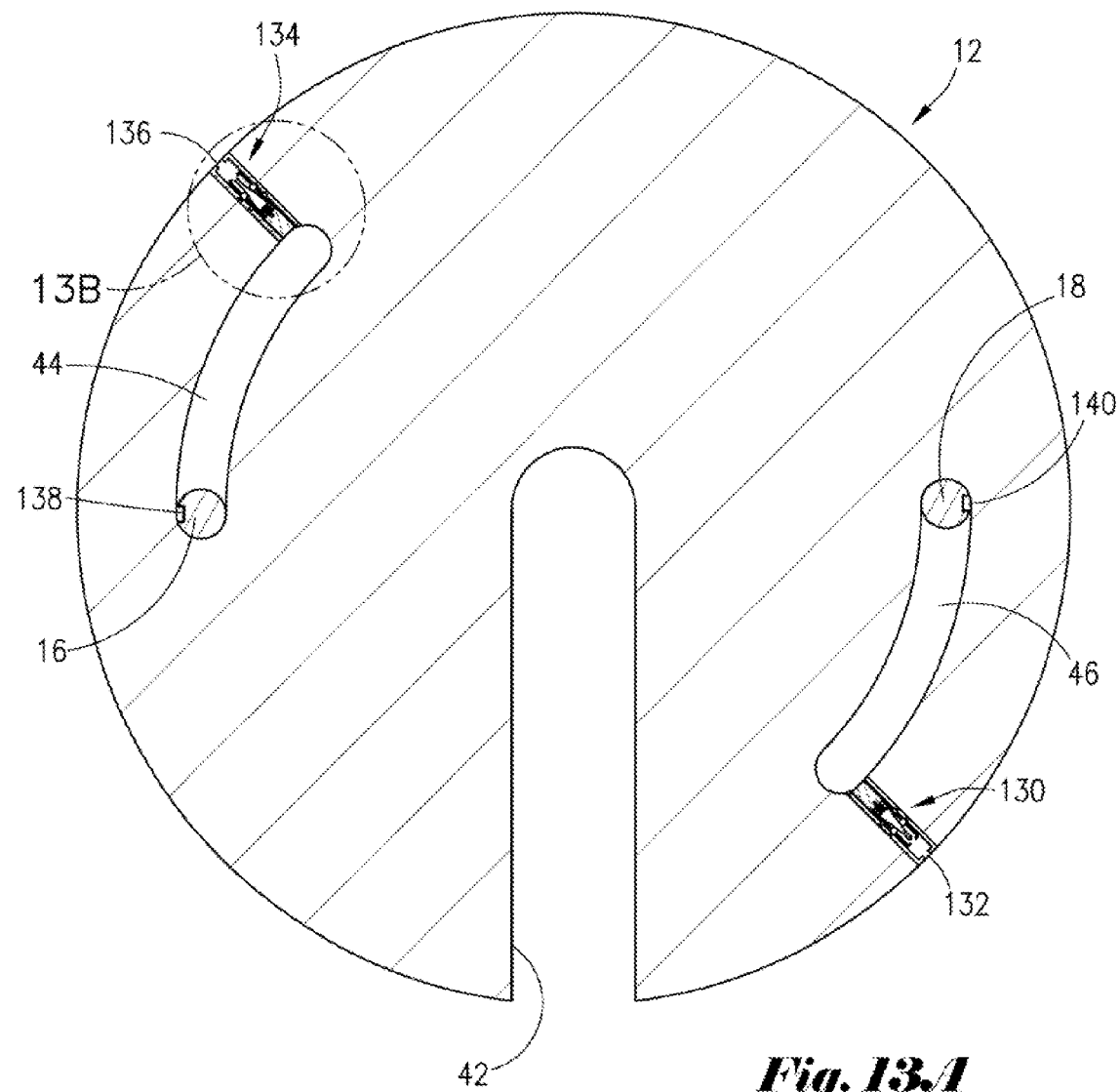
FIG. 13A is a cross-sectional view of the floatation device in FIG. 12 taken along line 13-13.

FIG. 13A is a cross-sectional view of the alternate embodiment of the wireline floatation device 2 of FIG. 12 taken along line 13-13. In FIG. 13A, device 2 is in the closed position. Pin members 16 and 18 are disposed in pin member recesses 44 and 46, respectively. Pin member 16 includes notch 138, and pin member 18 includes notch 140.

Figure 13B:
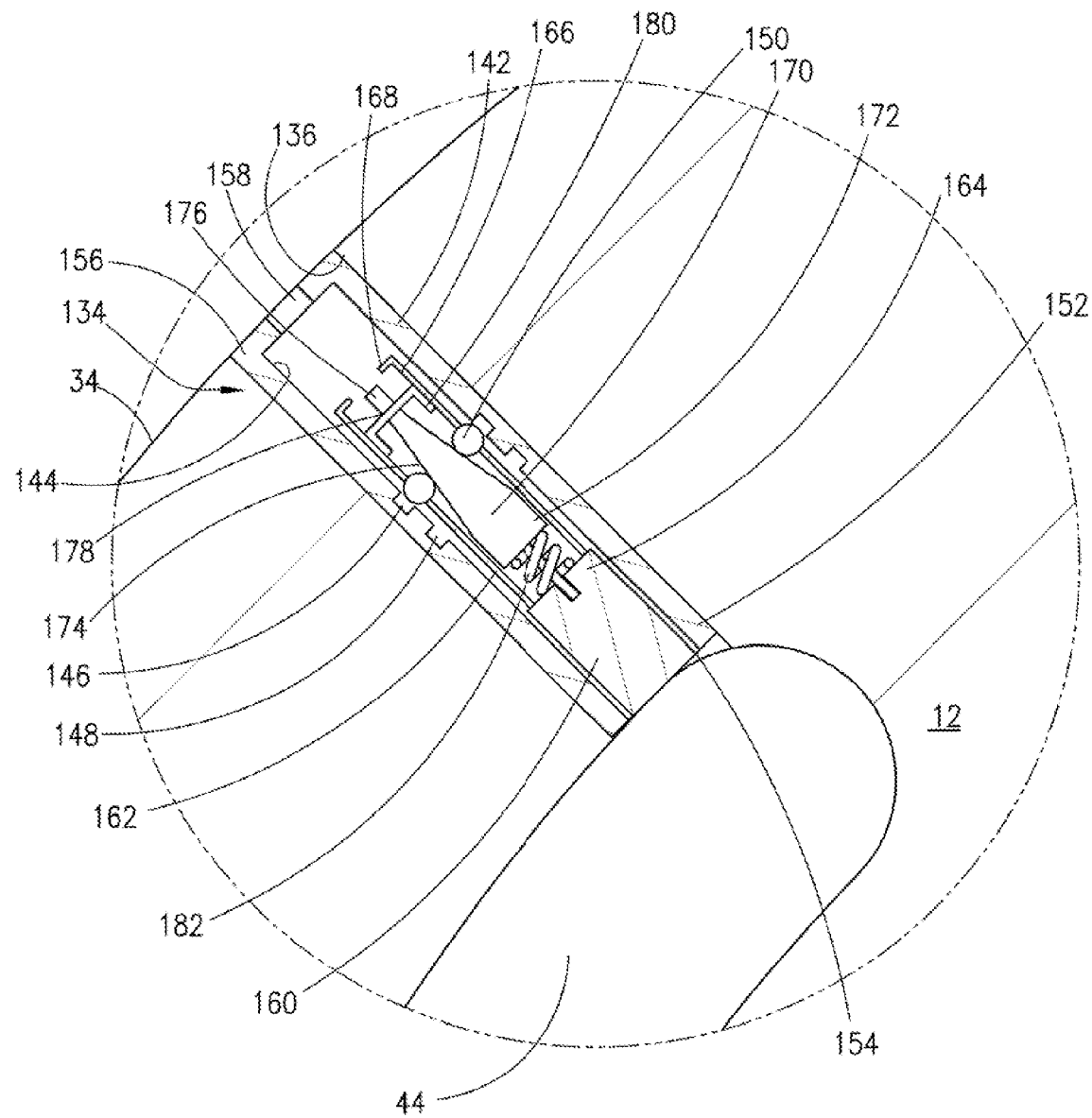
FIG. 13B is a cut away view of the floatation device in FIG. 13A.

Referring now to FIG. 13B, anti-rotation pin assembly 134 may be disposed within cavity 136 which may extend from second outer surface 34 to pin member recess 44. Anti-rotation pin assembly 134 may include body 142 having inner surface 144 with a set of outer bearing cavities 146 and a set of inner bearing cavities 148. Outer and inner bearing cavities 146, 148 may be adapted to selectively engage a set of bearings 150. The number of outer and inner bearing cavities 146, 148 may be equal to the number of bearings 150. Anti-rotation pin assembly 134 may include any number of bearings 150. In preferred embodiments, anti-rotation pin assembly 134 may include two or three bearings 150. Body 142 may also have proximal end 152 with proximal opening 154 and distal end 156 with distal opening 158.

Referring still to FIG. 13B, stopper 160 may be disposed within body 142 adjacent to proximal opening 154. Support member 162 may extend from distal end 164 of stopper 160, and distal end 166 of support member 162 may have one or more protuberances 168. Plug 170 may be disposed within support member 162. Plug 170 may have proximal end 172, tapered outer surface 174, and distal neck 176. Distal neck 176 may be slidingly disposed through aperture 178 in guide 180 which may be disposed within distal end 166 of support member 162. Guide 180 may be fixedly attached within distal end 166 of support member 162. Alternatively, guide 180 may be an integral part of distal end 166 of support member 162. Tapered outer surface 174 may selectively force bearings 150 into inner or outer bearing cavities 146 or 148. Spring 182 may be disposed between proximal end 172 of plug 170 and distal end 164 of stopper 160. Anti-rotation pin assembly 130 may be designed in the same way as anti-rotation pin assembly 134.

Figure 14A:
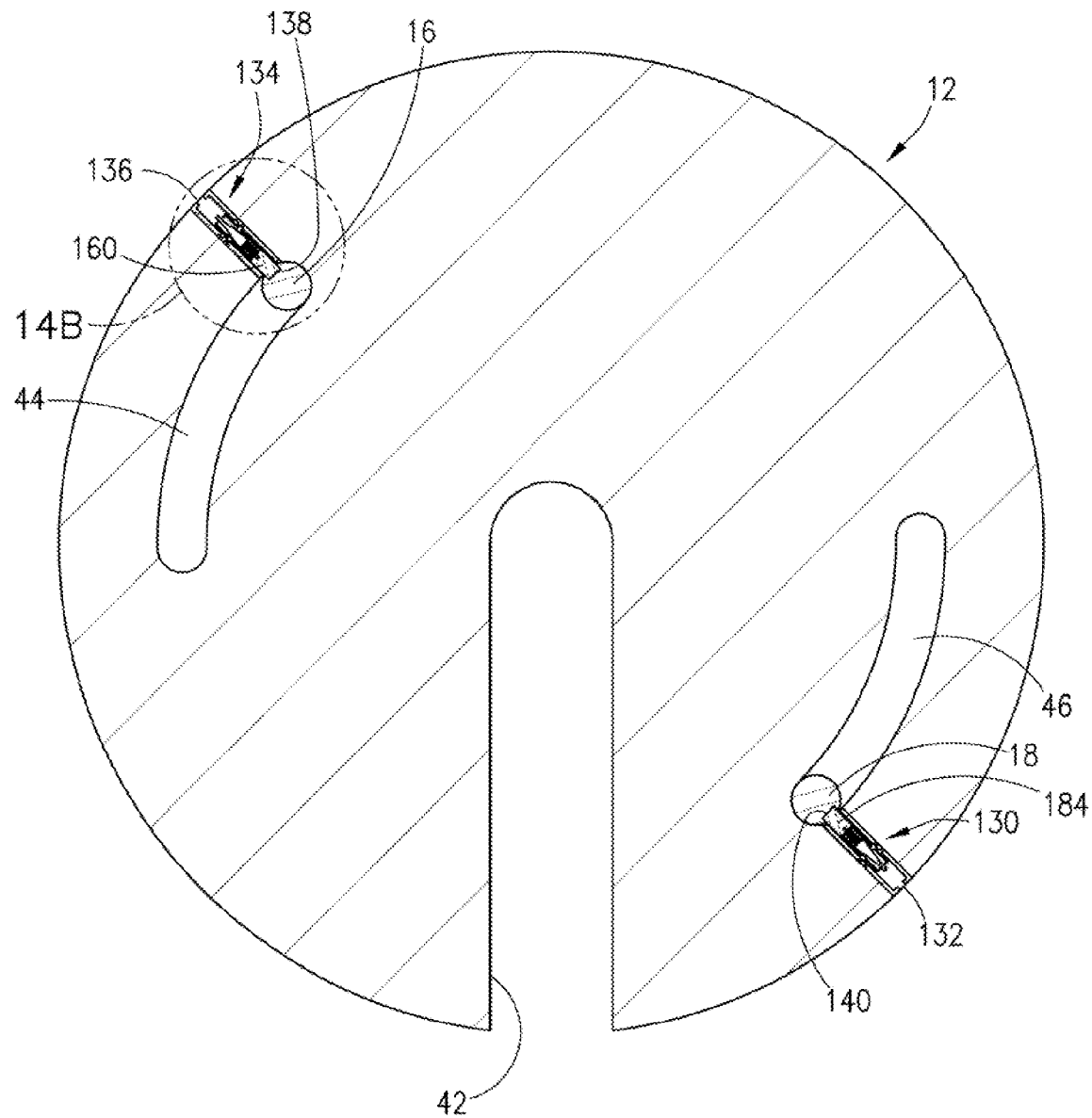
FIG. 14A is a cross-sectional view of the floatation device in FIG. 13A in the engaged position.

Referring now to FIG. 14A, device 2 is in the engaged position. Second floatation module 12 was rotated ninety degrees relative to first and third floatation modules 10, 14 thereby rotating pin member recesses 44, 46 relative to pin members 16 and 18 whose ends are fixed within first and third floatation modules 10, 14. Alternatively, second floatation module 12 may have been rotated forty-five degrees relative to first and third floatation modules 10, 14. Any other degree of rotation of module 12 may be used that aligns second key recess 78 with first and third key recesses 76, 80. Anti-rotation pin assemblies 130, 134 were also moved into the engaged positions in which stopper 184 engages notches 140 in pin member 18 and stopper 160 engages notch 138 in pin 16 such that second floatation module 12 may not rotate relative to pin members 16, 18.

Figure 14B:
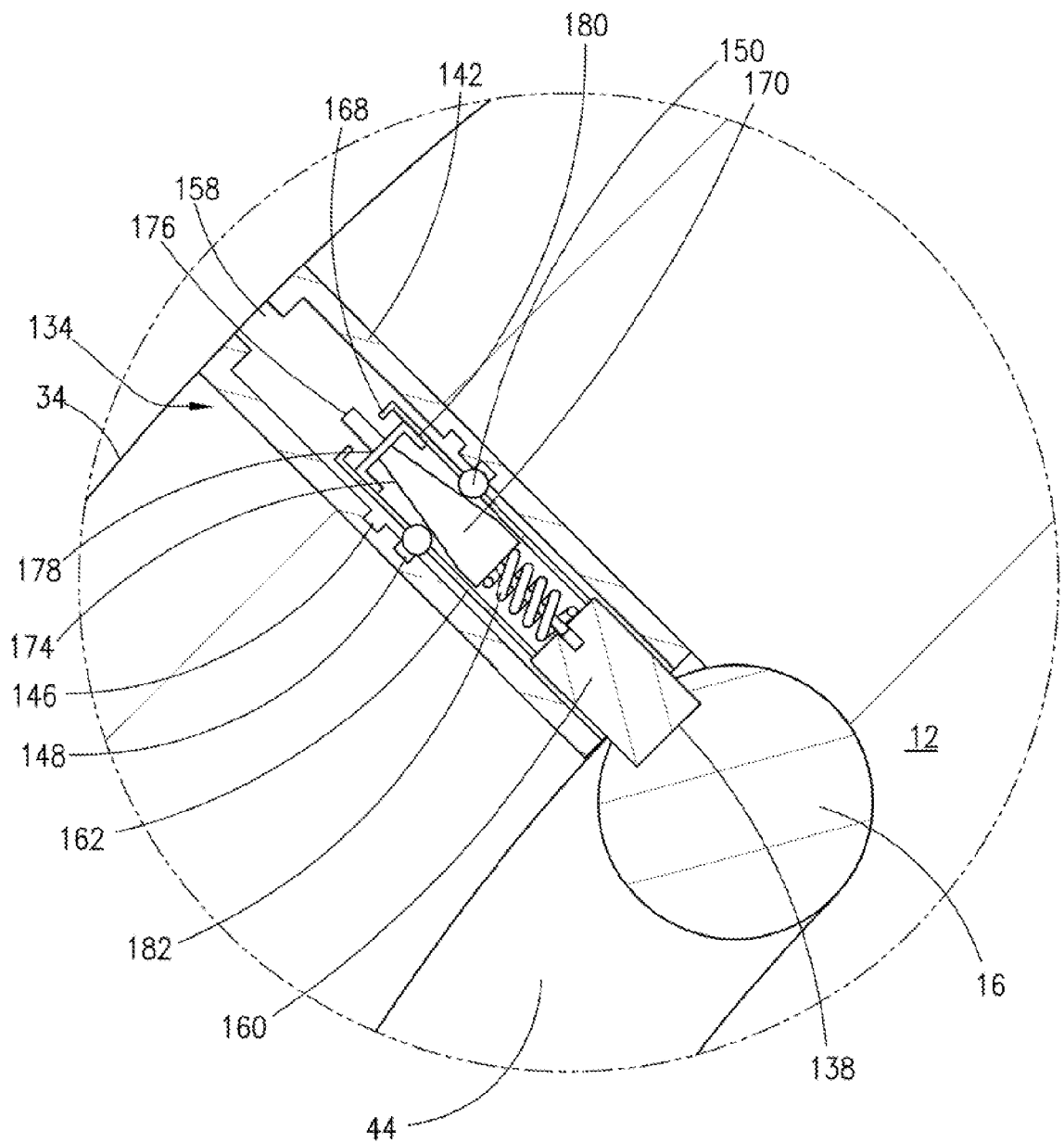
FIG. 14B is a cut away view of the floatation device in FIG. 14A.
Figure 15:
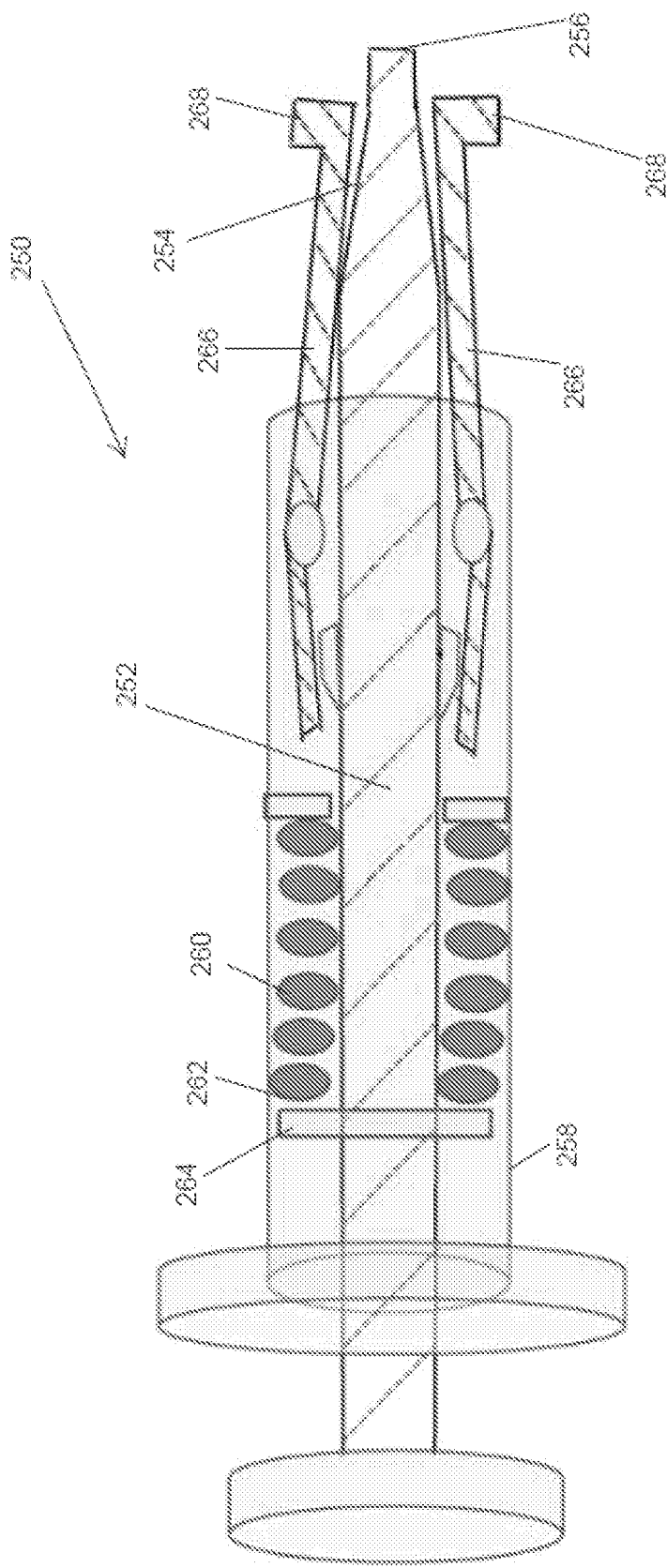
FIG. 15 is a plan view of a tool for an anti-rotation pin assembly of the floatation device in FIG. 12.

Tool 250 shown in FIG. 15 may be used to manually move anti-rotation pin assembly 134 between the neutral position shown in FIG. 13B and the engaged position shown in FIG. 14B. In the neutral position, tapered outer surface 174 of plug 170 may secure bearings 150 in engagement with outer bearing cavities 146 such that stopper 160 is disposed entirely within proximal end 152 of body 142.

Tool 250 may include central member 252 having tapered outer surface 254 leading to compression tip 256 at a distal end of tool 250. Central member 252 may be disposed within housing 258. Spring 260 may also be disposed within housing 258 around central member 252. Distal end 262 of spring 260 may be operatively connected to central member 252, such as through connection member 264. Connection member 264 may be a ring disposed around central member 252, a radial extension from central member 252, or any other mechanism for connecting distal end 262 of spring 260 to a fixed point on central member 252. Tool 250 may further include arms 266 extending from within housing 258 and positioned around central member 252. Each arm 266 may include extension 268 at its distal end. Tool 250 may include two or more arms 266 positioned around central member 252.

Compression tip 256 of central member 252 and extensions 268 of each arm 266 of tool 250 may be inserted through distal opening 158 of body 142 and past protuberances 168. Compression tip 256 of central member 252 may engage distal neck 176 of plug 170. Selectively applying force to tool 250 may cause compression tip 256 to force distal neck 176 to slide forward through aperture 178 in guide 180 until extensions 268 of arms 266 engage an outer surface of guide 180. This will compressing spring 182. The displacement of plug 170 may release bearings 150 from outer bearing cavities 146 thereby allowing the displacement of support member 162 within body 142. By further selectively applying force to tool 250, extensions 268 of arms 266 may cause support member 162 to be projected forward such that stopper 160 engages notch 138 in pin member 16. Withdrawing tool 250 from body 142 may allow spring 182 to push plug 170 such that distal neck 176 is again disposed through aperture 178. As plug 170 travels backward, tapered outer surface 174 may force bearings 150 into engagement with inner bearing cavities 148 such that anti-rotation pin assembly 134 is locked in the engaged position as shown in FIG. 14B.

Tool 250 may also be used to return anti-rotation pin assembly 134 to the neutral position. In the same way, compression tip 256 of central member 252 and extensions 268 of arms 266 may be inserted to displace plug 170 forward and compress spring 182. Bearings 150 may be released from inner bearing cavities 148 by the displacement of plug 170. A user may apply additional force to central member 252 such that compression tip 256 extends further beyond extensions 268 of arms 266. As central member 252 slides through arms 266, spring 260 may be compressed and tapered outer surface 254 of central member 252 may force extensions 268 of arms 266 radially outward such that extensions 268 may engage an inner surface of protuberances 168. A user may then pull tool 250 outwardly such that extensions 268 apply backward force to protuberances 168 thereby pulling support member 162 backward and stopper 160 out of engagement with notch 138. The user may then release the additional force from central member 252 such that spring 260 pulls central member 252 back to its initial position allowing extensions 268 to retract and again fit through the opening between protuberances 168. After releasing protuberances 168 and distal neck 176 of plug 170, spring 182 may push plug 170 backward such that tapered outer surface 174 forces bearings 150 into engagement with outer bearing cavities 146 and anti-rotation pin assembly 134 is locked in the neutral position as shown in FIG. 13B.

Second floatation module 12 may be rotationally locked in the engaged position with anti-rotation key assembly 84 as shown in FIGS. 6-11, with anti-rotation pin assemblies 130, 134 as shown in FIGS. 12-14B, or with any other anti-rotation locking mechanism capable of selectively preventing rotation of second floatation module 12 relative to first and third floatation modules 10, 14. After releasing the locking mechanism used, device 2 may be removed from wireline 74 by rotating second floatation module 12 in the opposite direction to position second groove 42 in line with first and third grooves 28, 56 again forming wireline window 72 as shown in FIG. 3. This reverse rotation of second floatation module 12 may release the grip force exerted on wireline 74 by each of the plurality of friction slips 68 (FIGS. 2 and 12). Wireline 74 may then be removed from device 2 by sliding wireline 74 through wireline window 72 to outer surfaces 20, 34, 48.

Figure 16:
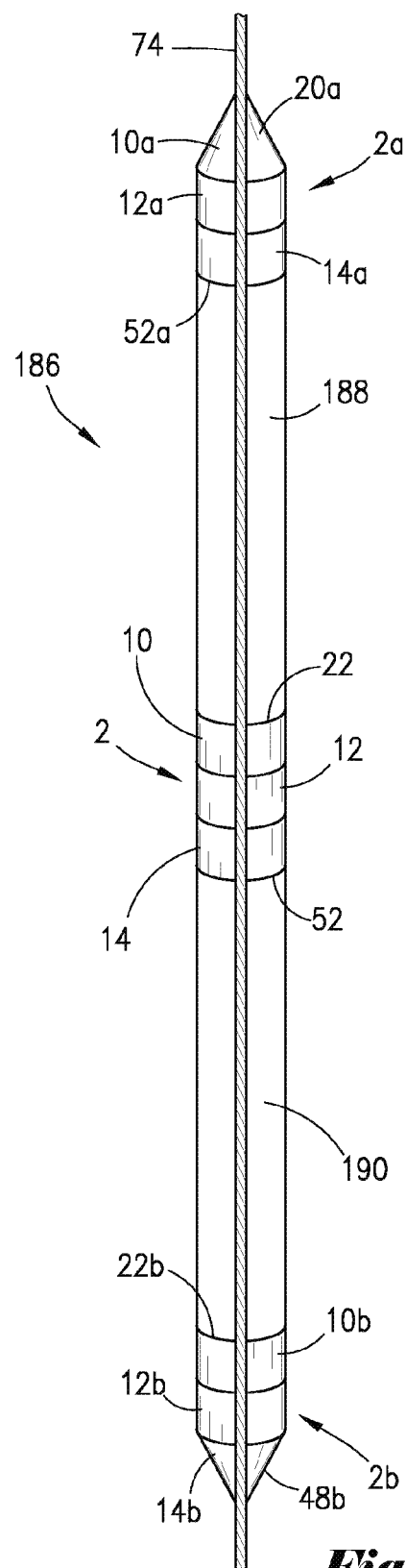
FIG. 16 is a plan view of an alternate embodiment of the floatation device in the closed position on a wireline.
Figure 17:
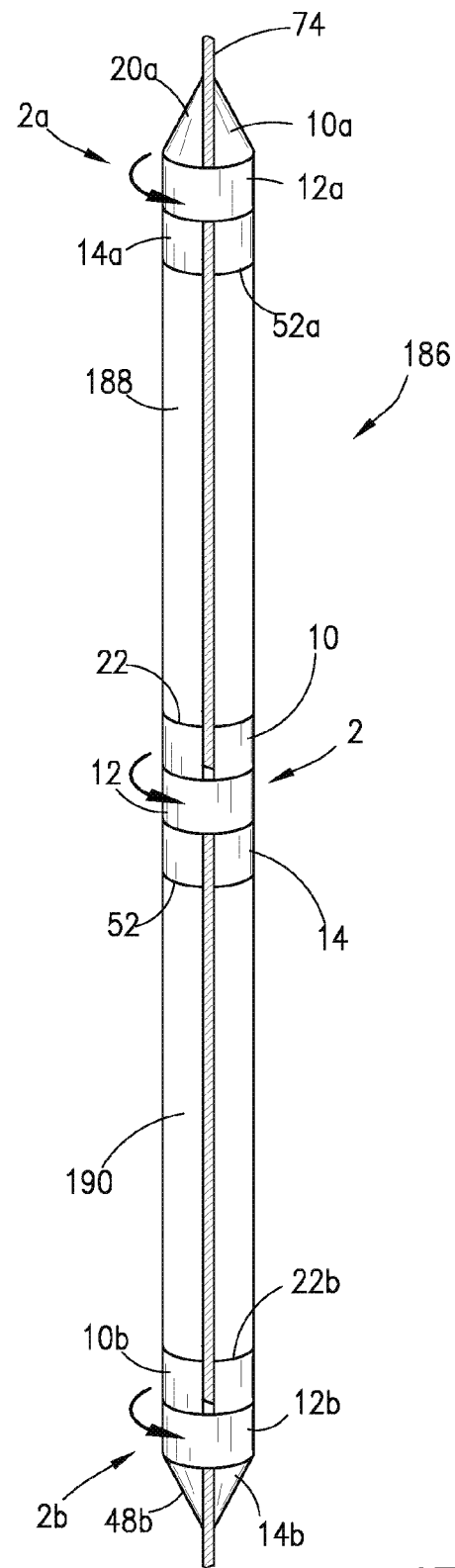
FIG. 17 is a plan view of the alternate embodiment of the floatation device in the engaged position on the wireline.

FIGS. 16 and 17 show an alternate embodiment in which floatation modules 10, 12, 14 may be used to attach one or more buoyant modules to wireline 74. In this embodiment, floatation modules 10, 12, 14 may be completely or partially formed of buoyant material as previously described. Alternatively, floatation modules 10, 12, 14 may be formed of metal such as aluminum, carbon steel, stainless steel, polymers, plastics, or polyurethane. In yet another embodiment, floatation modules 10, 12, 14 may include an integrally formed elongated sleeve formed of buoyant material.

With reference to FIGS. 16 and 17, wireline floatation assembly 186 may include buoyant modules 188, 190 secured to wireline 74 with device 2, device 2a, and device 2b. Devices 2a and 2b may exact replicas of device 2. Alternatively, first outer surface 20a of device 2a's first floatation module 10a may be tapered as shown in FIGS. 16 and 17. Similarly, third outer surface 48b of device 2b's third floatation module 14b may also be tapered as shown in FIGS. 16 and 17. This tapered shape may provide for improved movement within a riser or well bore. Buoyant module 188 may be permanently or selectively attached to third bottom face 52a of device 2a and to first top face 22 of device 2. Buoyant module 190 may be permanently or selectively attached to third bottom face 52 of device 2 and to first top face 22b of device 2b. Buoyant modules 188 and 190 may each have a groove similar to grooves 28, 42, 56.

Buoyant modules may be attached to devices 2, 2a, and 2b, then wireline floatation assembly 186 may be attached to wireline 74 with devices 2, 2a, and 2b in the closed position as previously described and as shown in FIG. 16. Alternatively, buoyant modules 188 and 190 and devices 2, 2a, and 2b may each be attached to wireline 74 separately and attached to one another thereafter. Second floatation modules 12, 12a, 12b may each be rotated, and anti-rotation key assembly 84 or anti-rotation pin assemblies 130, 134 may be engaged such that second floatation modules 12, 12a, and 12b may each be rotationally locked. FIG. 17 illustrates wireline floatation assembly in the engaged position.

Figure 18:
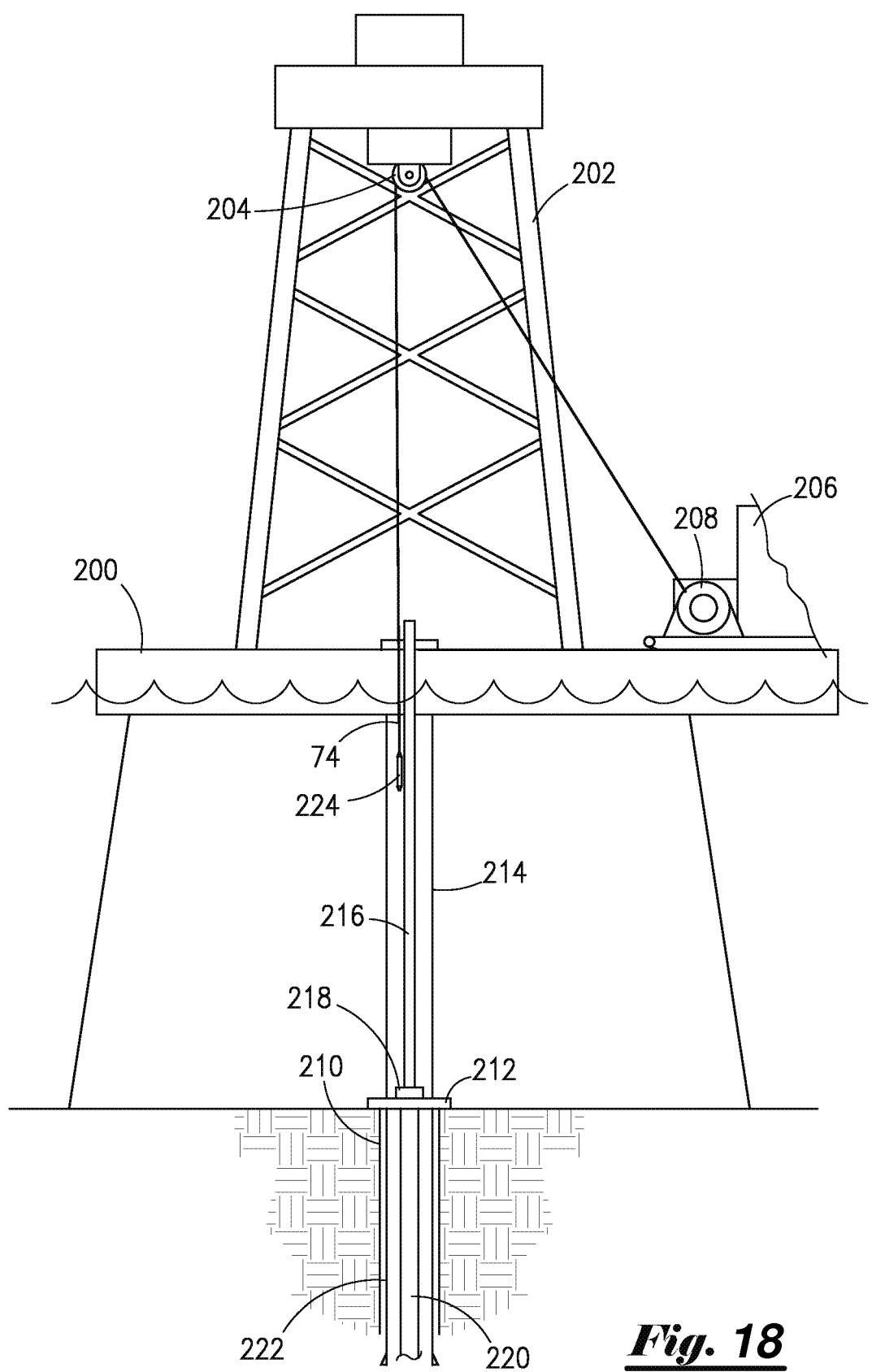
FIG. 18 is a schematic view of the wireline tool being deployed downhole.

FIG. 18 illustrates an offshore platform 200 containing derrick 202 with a hoisting system having sheave 204 and wireline unit 206 having winch drum 208. Platform 200 is positioned over well bore 210. Sub-sea well head 212 is positioned over well bore 210 at the ocean floor, and marine riser 214 extends from sub-sea well head 212 to platform 200. Landing string 216 extends from platform 200 to casing hanger 218 within marine riser 214. Casing string 220 extends from casing hanger 218 into surface casing 222 positioned within well bore 210.

Figure 19:
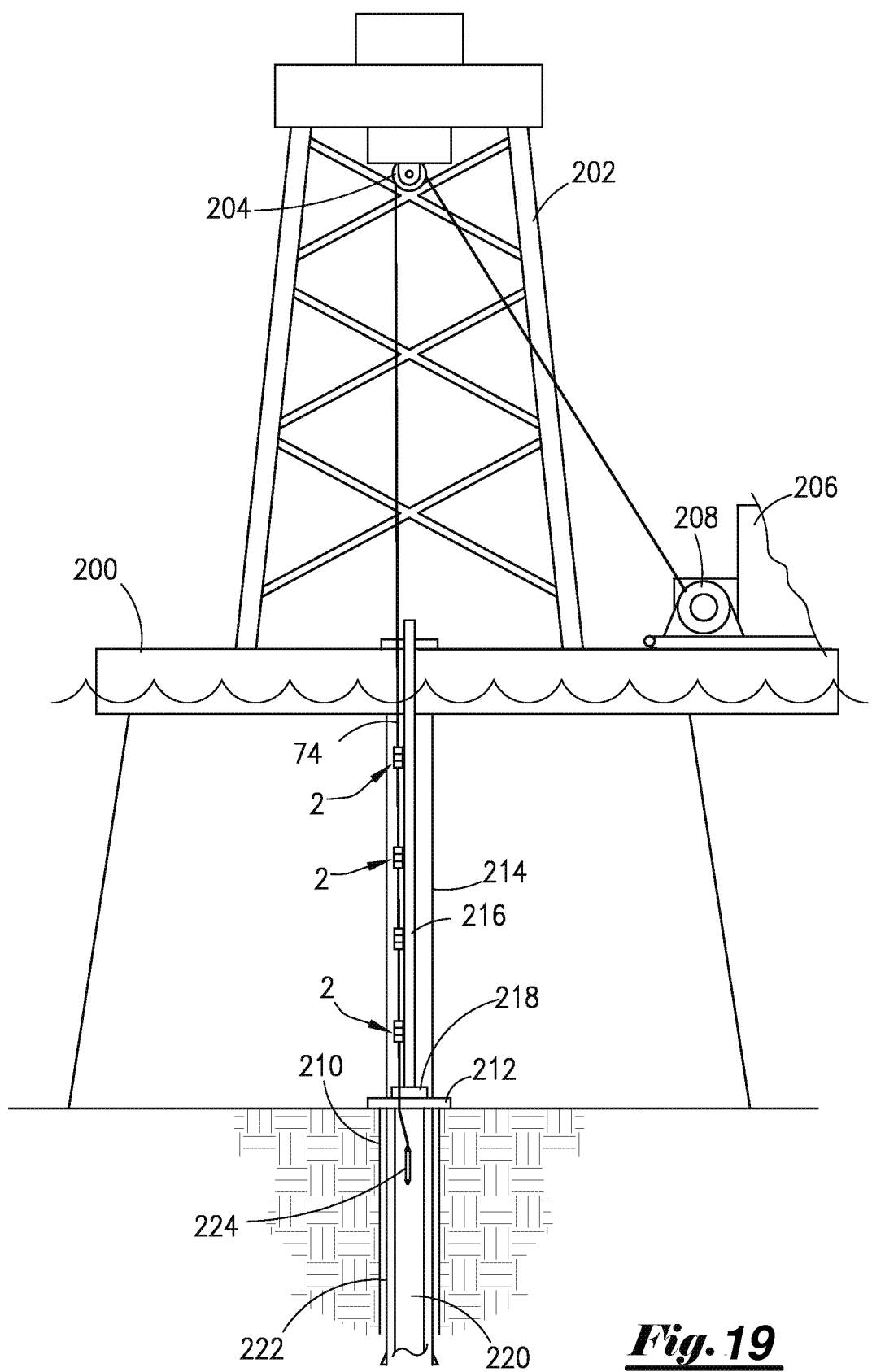
FIG. 19 is a schematic view of wireline deployed downhole with floatation devices affixed thereto.

With reference to FIGS. 18 and 19, any number of devices 2 may be attached to wireline 74 to reduce its overall weight. Deployment of device 2 may first include operatively connecting wireline tool 224 to the end of wireline 74 and running tool 224 down marine riser 214 to a predetermined depth so that device 2 may be affixed to wireline 74. Device 2 is attached to wireline 74 on platform 200 as previously described herein. A plurality of devices 2 may be attached to wireline 74 by alternately lowering wireline tool 224 a specified length then attaching another device 2 to wireline 74. This process may be repeated until the desired number of devices 2 are affixed to wireline 74. The number of devices 2 to be attached to wireline 115 may depend on a variety of factors such as the wireline operations, cable size, depth of deployment of wireline tool 224, material composition of devices 2, and size of devices 2.

FIG. 19 further illustrates that with devices 2 attached, wireline 74 and wireline tool 224 may be run further down marine riser 214. Because marine riser 214 is filled with fluid, the plurality of devices 2 will reduce the weight below each device 2, thus reducing the overall weight of wireline 74 that is otherwise accumulated at top sheave 204 which wireline 74 spools through. Wireline 74 is lowered further through casing hanger 218 and into casing string 220. Wireline tool 224 may be lowered to a predetermined depth within casing string 220 by safely reducing the rig hoisting requirements. Alternatively, any number of wireline floatation assemblies 186 may be attached to wireline 74 in the same manner to serve the same weight reducing function.

Once wireline tool 224 reaches the predetermined depth within casing string 220, tool 224 may be actuated to perform its intended function. If tool 224 is a logging tool for example, wireline logging measurements may be made as wireline 74 is pulled out of casing string 220 in order to ensure accurate depth measurements by maintaining tension of wireline 74. On offshore platform 200, the plurality of devices 2 may be removed from wireline 74 as described hereinabove. Wireline 74 may then be spooled onto winch drum 208 of wireline unit 206.

Devices 2 or wireline floatation assemblies 186 may also be used in wireline operations conducted in shallow waters using drilling barge or on land using a land rig. Devices 2 or assemblies 186 may also be used in wireline operations during drilling using a boring machine, drilling using an intervention vessel, or when boring holes for utility work. Devices 2 or assemblies 186 have application for wireline or cable drilling or production activities where the need exists to provide buoyancy to lessen the weight of the wireline.

The embodiments shown in the drawings and described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing herefrom will be limited only by the scope of the appended claims.

What is claimed is:

1. A wireline floatation device, comprising:
   a first floatation module having a first top face, a first bottom face, a first inner portion, a first outer surface, and a first groove, the first groove extending longitudinally through the first floatation module from the first top face to the first bottom face and laterally through the first floatation module from the first inner portion to the first outer surface;
   a second floatation module having a second top face, a second bottom face, a second inner portion, a second outer surface, and a second groove, the second groove extending longitudinally through the second floatation module from the second top face to the second bottom face and laterally through the second floatation module from the second inner portion to the second outer surface; and
   a third floatation module having a third top face, a third bottom face, a third inner portion, a third outer surface, and a third groove, the third groove extending longitudinally through the third floatation module from the third top face to the third bottom face and laterally through the third floatation module from the third inner portion to the third outer surface;
   a first pin member interconnecting the first, second, and third floatation modules:
   wherein the first, second, and third floatation modules each comprises a buoyant material and when detachably affixed to a wireline run down a well bore reduce the overall weight of the wireline.

2. The wireline floatation device according to claim 1, wherein the first floatation module includes a first pin member bore in the first bottom face adapted to receive a first end of the first pin member; wherein the third floatation module includes a first pin member bore in the third top face adapted to receive a second end of the first pin member; and wherein the second floatation module includes a first pin member recess extending from the second top face to the second bottom face and adapted to slidingly receive the first pin member.

3. The wireline floatation device according to claim 2, further comprising:
   a second pin member interconnecting the first, second, and third floatation modules;
   wherein the first floatation module includes a second pin member bore in the first bottom face;
   wherein the third floatation module includes a second pin member bore in the third top face; and
   wherein the second floatation module includes a second pin member recess extending from the second top face to the second bottom face and adapted to slidingly receive the second pin member.

4. The wireline floatation device according to claim 2, wherein when the first, second, and third floatation modules are in operative engagement and the first, second and third grooves are aligned, the first, second and third grooves form a wireline window for receiving the wireline.

5. The wireline floatation device according to claim 4, wherein the first, second and third grooves each includes a wireline receptacle portion adapted to operatively house the wireline.

6. The wireline floatation device according to claim 5, wherein the second floatation module reciprocates with respect to the first and third floatation modules while the wireline is housed in the wireline receptacle portions to prevent the wireline from exiting the wireline receptacle portions.

7. The wireline floatation device according to claim 6, wherein one or more of the first, second or third floatation modules includes a plurality of slips to retain the device on the wireline at a predetermined position when the wireline is housed in the wireline receptacle portions of the first, second and third floatation modules.

8. The wireline floatation device according to claim 6, further comprising an anti-rotation assembly selectively disabling the second floatation module from re-reciprocating to form the wireline window.

9. The wireline floatation device according to claim 8, wherein the anti-rotation assembly includes a key assembly disposed within a key recess in the second floatation module, the key assembly including one or more spring-loaded keys; and wherein the first and third floatation modules each includes a key recess adapted to receive each of the one or more spring-loaded keys when the second floatation module is reciprocated, thereby disabling the second floatation module from re-reciprocating to form the wireline window.

10. The wireline floatation device according to claim 9, wherein the key assembly includes a first key, a second key, and a body including a first spring operatively connected to the first key and a second spring operatively connected to the second key; wherein the first floatation module includes a first key recess adapted to receive the first key due to the force exerted by expansion of the first spring when the second floatation module is reciprocated; and wherein the third floatation module includes a second key recess adapted to receive the second key due to the force exerted by an expansion of the second spring when the second floatation module is reciprocated.

11. The wireline floatation device according to claim 10, wherein the first and second keys each includes a release groove, engagement of the release grooves compresses the first and second springs to disengage the first and second keys from the first and second key recesses, thereby allowing re-reciprocation of the second floatation module to form the wireline window.

12. The wireline floatation device according to claim 10, wherein the body includes a longitudinal lip for slidingly engaging a groove of the key recess of the second floatation module for retaining the key assembly within the key recess.

13. The wireline floatation device according to claim 8, wherein the anti-rotation assembly includes a first pin assembly disposed within a first in the second floatation module, the first pin assembly selectively engaging the first pin member when the second floatation module is reciprocated, thereby disabling the second floatation module from re-reciprocating to form the wireline window.

14. The wireline floatation device according to claim 13, further comprising:

a second pin member interconnecting the first, second, and third floatation modules; wherein the first floatation module includes a second pin member bore in the first bottom face; wherein the third location module includes a second pin member bore in the third top face; and wherein the second floatation module includes a second pin member recess extending from the second top face to the second bottom face and adapted to slidingly receive the second pin member;

wherein the anti-rotation assembly further includes a second pin assembly disposed within a second cavity in the second floatation module, the second pin assembly selectively engaging the second pin member when the second floatation module is reciprocated, thereby disabling the second floatation module from re-reciprocating to form the wireline window.

15. The wireline floatation device according to claim 14, wherein the first pin assembly comprises: a body affixed to an inner wall of the first cavity, the body includes an inner surface having one or more outer bearing cavities and one or more inner bearing cavities; a stopper slidingly disposed within the body; a support member slidingly disposed within the body, an internal end of the support member affixed to the stopper such that translational movement of the support member within the body translationally moves the stopper within the body; and one or more bearings adapted to selectively engage the one or more outer bearing cavities and the one or more inner bearing cavities such that translational movement of the support member and the stopper is disabled; wherein in a neutral position the one or more bearings engage the one or more outer bearing cavities such that the stopper is locked within the body, and wherein in an engaged position the one or more bearings engage the one or more inner bearing cavities such that the stopper is locked into engagement with a notch in the first pin member; and wherein the second pin assembly comprises: a body affixed to an inner wall of the second cavity, the body includes an inner surface having one or more outer bearing cavities and one or more inner bearing cavities; a stopper slidingly disposed within the body; a support member slidingly disposed within the body, an internal end of the support member affixed to the stopper such that translational movement of the support member within the body translationally moves the stopper within the body; and one or more bearings adapted to selectively engage the one or more outer bearing cavities and the one or more inner bearing cavities such that translational movement of the support member and the stopper is disabled; wherein in a neutral position the one or more bearings engage the one or more outer bearing cavities such that the stopper is locked within the body, and wherein in an engaged position the one or more bearings engage the one or more inner bearing cavities such that the stopper is locked into engagement with a notch in the second pin member.

16. A method of reducing the weight of a wireline deployed down a well bore, comprising the steps of:

(a) providing a first wireline floatation device comprising a first floatation module having a first top face, a first bottom face, a first inner portion, a first outer surface, and a first groove, the first groove extending longitudinally through the first floatation module from the first top face to the first bottom face and laterally through the first floatation module from the first inner portion to the first outer surface: a second floatation module having a second top face, a second bottom face, a second inner portion, a second outer surface, and a second groove, the second groove extending longitudinally through the second floatation module from the second top face to the second bottom face and laterally through the second floatation module from the second inner portion to the second outer surface, and a third floatation module having third to face, third bottom face, a third inner portion, a third outer surface, and a third groove, the third groove extending longitudinally through the third floatation module from the third top face to the third bottom face and laterally through the third floatation module from the third inner portion to the third outer surface; a first pin member interconnecting the first, second, and third floatation modules; wherein the first, second, and third floatation modules are adapted to be detachably affixed to a wireline thereby buoyantly reducing the wireline's overall weight;

(b) attaching the first wireline floatation device to the wireline; and (c) running the wireline down the well bore to a position where the first wireline floatation device becomes buoyant and lessens the weight of the wireline.

17. The method according to claim 16, further comprising the steps of:

(b1) providing a second wireline floatation device comprising a first floatation module having a first top face, a first bottom face, a first inner portion, a first outer surface, and a first groove, the first groove extending longitudinally through the first floatation module from the first top face to the first bottom face and laterally through the first floatation module from the first inner portion to the first outer surface; a second floatation module having a second top face, a second bottom face, a second inner portion, a second outer surface, and a second groove, the second groove extending longitudinally through the second floatation module from the second top face to the second bottom face and laterally through the second floatation module from the second inner portion to the second outer surface; and a third floatation module having a third top face, a third bottom face, a third inner portion, a third outer surface, and a third groove, the third groove extending longitudinally through the third floatation module from the third top face to the third bottom face and laterally through the third floatation module from the third inner portion to the third outer surface; a first pin member interconnecting the first, second, and third flotation modules; wherein the first, second, and third floatation modules are adapted to be detachably affixed to a wireline thereby buoyantly reducing the wireline's overall weight;

(b2) attaching the second wireline floatation device to the wireline; and wherein in step (c), the wireline is run down the well bore to a position where both the first and second wireline floatation devices become buoyant and further lessen the weight of the wireline.

18. The method according to claim 17, further comprising the steps of:

(d) pulling the wireline out of the well bore;

(e) detaching the second wireline floatation device from the wireline; and (f) detaching the first wireline floatation device from the wireline.

* * * * *